(12) United States Patent
Kim

(10) Patent No.: US 11,597,359 B1
(45) Date of Patent: Mar. 7, 2023

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/738,240

(22) Filed: May 6, 2022

(30) Foreign Application Priority Data

Aug. 23, 2021 (KR) ........................ 10-2021-0110658

(51) Int. Cl.
G05G 1/40 (2008.04)
B60T 7/06 (2006.01)
B60T 7/04 (2006.01)
B60K 26/02 (2006.01)

(52) U.S. Cl.
CPC .............. *B60T 7/065* (2013.01); *B60K 26/02* (2013.01); *B60T 7/042* (2013.01); *B60K 2026/026* (2013.01)

(58) Field of Classification Search
CPC .. G05G 1/30; G05G 1/32; G05G 1/36; G05G 1/40; G05G 1/405; G05G 5/005; G05G 5/28; B60K 26/02; B60K 2026/024; B60K 2026/026; B60T 7/04; B60T 7/06; B60T 7/065; B60R 21/09
See application file for complete search history.

(56) References Cited

U.S. PATENT DOCUMENTS

| 5,101,927 A * | 4/1992 | Murtuza ................... B60T 7/22 293/118 |
| 6,182,525 B1 * | 2/2001 | Bowers ................... B60K 23/02 180/274 |
| 6,298,745 B1 * | 10/2001 | Rixon ....................... B60T 7/06 74/514 |
| 6,364,047 B1 * | 4/2002 | Bortolon ................ B60K 23/02 74/513 |

(Continued)

FOREIGN PATENT DOCUMENTS

| DE | 202011000698 U1 * | 8/2012 | ............. B60K 26/02 |
| DE | 102019207363 A1 * | 11/2020 | ............... G05G 1/40 |

(Continued)

OTHER PUBLICATIONS

Machine Translation of DE 10 2019 207 363.*
Machine Translation of DE 20 2011 000 698.*
Machine Translation of DE 20 2019 210 874.*

*Primary Examiner* — Brian J McGovern
(74) *Attorney, Agent, or Firm* — Morgan, Lewis & Bockius LLP

(57) ABSTRACT

The present disclosure relates to a foldable pedal apparatus for a vehicle, and is configured so that in an autonomous traveling situation, an accelerator pedal apparatus and a brake pedal apparatus are slid and moved to the left and the right of a dash panel and hidden, respectively, and therefore, in hidden states of being inoperable by a driver, and in a manual driving mode, the accelerator pedal apparatus and the brake pedal apparatus are slid and moved to be gathered to the center of the dash panel and exposed, respectively, and therefore, in popped-up states of being operable by the driver.

16 Claims, 10 Drawing Sheets

(56) References Cited

U.S. PATENT DOCUMENTS

| | | | | |
|---|---|---|---|---|
| 2009/0038431 A1* | 2/2009 | Willemsen | ............ | B60K 23/02 |
| | | | | 74/512 |
| 2009/0223319 A1* | 9/2009 | Choi | ........................ | G05G 1/36 |
| | | | | 74/512 |
| 2011/0132134 A1* | 6/2011 | Kim | ........................ | F02D 11/02 |
| | | | | 74/514 |
| 2021/0004040 A1* | 1/2021 | Dohmen | .................. | G05G 1/42 |

FOREIGN PATENT DOCUMENTS

| | | | | |
|---|---|---|---|---|
| DE | 102019210874 A1 * | 1/2021 | ............. | B60K 26/02 |
| EP | 1488964 A1 * | 12/2004 | ............... | B60N 3/06 |
| KR | 10-2017-0137427 A | 12/2017 | | |
| WO | 2020/178259 A2 | 9/2020 | | |

* cited by examiner

FOLDABLE PEDAL APPARATUS FOR VEHICLE

CROSS REFERENCE TO RELATED APPLICATION

The present application claims the benefit of priority to Korean Patent Application No. 10-2021-0110658, filed on Aug. 23, 2021 in the Korean Intellectual Property Office, the entire contents of which is incorporated herein for all purposes by reference.

BACKGROUND OF THE DISCLOSURE

Field of the Disclosure

The present disclosure relates to a foldable pedal apparatus for a vehicle, and more specifically, to a technology relating to a foldable pedal apparatus for a vehicle, which is changed to allow an accelerator pedal apparatus and a brake pedal apparatus to be in a hidden state of being inoperable by a driver and in a popped-up state of being operable by the driver by being horizontally moved depending upon an autonomous traveling situation and a manual driving situation.

Description of the Related Art

An autonomous vehicle is a smart vehicle combined with an autonomous traveling technology of finding a destination by itself even without a driver directly operating a steering wheel, an accelerator pedal, and a brake, and is rapidly developed recently.

If an autonomous traveling situation is universally realized, it is possible to select a manual driving mode in which the driver directly drives a vehicle and an autonomous traveling mode in which the vehicle travels to the destination by itself without the driver directly driving.

Since the driver should be able to comfortably take the rest by stretching his/her feet in the autonomous traveling mode, there is a disadvantage in that if a pedal (accelerator pedal or brake pedal) located in a space under a driver's seat is exposed to the inside as it is, this interferes with the driver's rest.

Further, the autonomous traveling situation is a situation in which the driver does not operate the vehicle pedal (accelerator pedal or brake pedal), and if the driver operates the pedal during the autonomous traveling, a vehicle control unit determines it as a situation in which the driver terminates the autonomous traveling and the driver wants to directly drive the vehicle to terminate a control for autonomous traveling.

However, since the vehicle pedal is installed in the space under the driver's seat to be exposed, there is a concern that the driver can unconsciously operate the pedal in the autonomous traveling situation (in a misoperation situation of the pedal), and in this case, there is a concern that an accident can occur depending on a road situation, an inter-vehicle distance, or etc.

Therefore, in the manual driving mode in which the driver directly drives the vehicle, the pedal pad is exposed to protrude toward the driver to be operable by the driver, and in the autonomous traveling situation, it is necessary to develop a technology for a pedal apparatus that blocks the exposure of the pedal pad to be inoperable by the driver for the driver's comfortable rest and safety such as preventing misoperation.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

An object of the present disclosure is to provide a foldable pedal apparatus for a vehicle, in which an accelerator pedal apparatus and a brake pedal apparatus are moved to the right and left of a dash panel and hidden, respectively, and therefore, in hidden states of being inoperable by a driver in an autonomous traveling situation, and the accelerator pedal apparatus and the brake pedal apparatus are moved to be gathered to the center of the dash panel and exposed, respectively in a manual driving mode, and therefore, in popped-up states of being operable by the driver, thereby allowing the driver to comfortably take the rest in the autonomous traveling situation, and furthermore, blocking a misoperation of the pedal in the autonomous traveling situation to improve safety.

Further, another object of the foldable pedal apparatus according to the present disclosure is to allow a driver to comfortably operate an accelerator pedal apparatus as much as possible through a configuration capable of horizontally, finely adjusting a location of the accelerator pedal apparatus in a popped-up state.

Further, still another object of the foldable pedal apparatus is to secure a vehicle interior space and a space of an engine room as much as possible through a configuration capable of minimizing a hidden space of a pedal apparatus in a hidden state.

A foldable pedal apparatus for a vehicle according to an exemplary embodiment of the present disclosure for achieving the objects includes a linear motor having a stator coupled to a vertical part of a dash panel extending horizontally and serving as a guide for guiding the movement and a mover coupled to the stator and horizontally movable along the stator when a current is applied thereto; and an accelerator pedal apparatus and a brake pedal apparatus coupled to the mover and movable together with the mover.

The mover of the linear motor comprises: an accelerator pedal mover coupled to the accelerator pedal apparatus, and a brake pedal mover coupled to the brake pedal apparatus, and the accelerator pedal mover and the brake pedal mover are independently operated.

When the accelerator pedal apparatus and the brake pedal apparatus are moved to first and second sides, away from each other, along the stator of the linear motor, respectively, and spaced apart from each other as far as possible within a predetermined range thereof, the accelerator pedal apparatus and the brake pedal apparatus are in hidden states of being inoperable by a driver.

When the accelerator pedal apparatus and the brake pedal apparatus are moved to the second side and the first side, towards each other, along the stator of the linear motor, respectively, and gathered to be close to each other, the accelerator pedal apparatus and the brake pedal apparatus are in popped-up states of being operable by the driver.

Each of the accelerator pedal apparatus and the brake pedal apparatus includes a pedal housing coupled to the mover of the linear motor; a pedal arm having an upper end rotatably coupled to the pedal housing and provided with a pedal pad on a lower end thereof; a permanent magnet coupled to an upper portion of the pedal arm; and a PCB fixed to the pedal housing to face the permanent magnet, and generating a pedal function-related signal through a change in magnetic flux depending upon a change in location of the permanent magnet upon rotation of the pedal arm.

The pedal arm of the accelerator pedal apparatus and the pedal arm of the brake pedal apparatus have upper sides connected to the pedal housings, bent outwardly in opposite directions, and installed to be symmetrical in a lateral direction.

When an autonomous traveling mode signal is generated in a state where the accelerator pedal apparatus and the brake pedal apparatus are popped up, the accelerator pedal apparatus and the brake pedal apparatus are moved to and located in a console side hidden space at the first side and a door side hidden space at the second side, respectively, and then, the accelerator pedal apparatus and the brake pedal apparatus are in the hidden states of being inoperable by the driver.

When a manual driving mode signal is generated in a state where the accelerator pedal apparatus and the brake pedal apparatus are hidden, the accelerator pedal apparatus and the brake pedal apparatus are moved to the second side and the first side up to pre-memorized locations and fixed thereto, respectively, and then, in the popped-up states of being operable by the driver.

The foldable pedal apparatus further includes a pressure sensor coupled to a horizontal part of the dash panel, in which when a manual driving mode signal and a pressure sensor signal are generated in the state where the accelerator pedal apparatus and the brake pedal apparatus are hidden, the brake pedal apparatus is moved to the first side up to a location where the pressure sensor signal is generated and fixed thereto, and the accelerator pedal apparatus is moved to the second side up to a location spaced apart from the brake pedal apparatus by a certain distance and fixed thereto, and then, the accelerator pedal apparatus and the brake pedal apparatus are in the popped-up states of being operable by the driver.

The pressure sensor signal is generated when the driver depresses the horizontal part of the dash panel with his/her foot to apply a load of a certain level or more to the pressure sensor.

When the manual driving mode signal is not generated and only the pressure sensor signal is generated in the state where the brake pedal apparatus is popped up or hidden, the brake pedal apparatus is not moved to the location where the pressure sensor signal is generated and maintains a current location.

When the driver operates a fine adjustment switch in the state where the accelerator pedal apparatus is popped up, the accelerator pedal apparatus is adjusted while being moved to the first side or the second side.

When the driver operates a one pedal mode switch in the state where the accelerator pedal apparatus and the brake pedal apparatus are popped up, the brake pedal apparatus is moved to a door side hidden space at the second side, and then, in the hidden state of being inoperable by the driver, and the accelerator pedal apparatus is moved to a pre-memorized location and fixed thereto, and then, in the popped-up state of being operable by the driver.

When the driver operates a two feet mode switch in the state where the accelerator pedal apparatus and the brake pedal apparatus are popped up, the accelerator pedal apparatus and the brake pedal apparatus are moved to the second side and the first side up to pre-memorized locations and fixed thereto, respectively, and then, in the popped-up states of being operable by the driver.

The foldable pedal apparatus further includes a pressure sensor coupled to the horizontal part of the dash panel, in which when a two feet mode signal and a pressure sensor signal are generated in the state where the accelerator pedal apparatus and the brake pedal apparatus are popped up, the accelerator pedal apparatus and the brake pedal apparatus are moved up to a location where the pressure sensor signal is generated by a right foot and a left foot and fixed thereto, respectively, and then, in the popped-states of being operable by the driver.

When a collision signal for operating airbags of a vehicle is generated, the accelerator pedal apparatus and the brake pedal apparatus are moved to and located in a console side hidden space at the first side and a door side hidden space at the second side, respectively, and then, the accelerator pedal apparatus and the brake pedal apparatus are in the hidden states of being inoperable by the driver, thereby preventing the driver's injury due to the accelerator pedal apparatus and the brake pedal apparatus upon collision accidents.

According to the foldable pedal apparatus for the vehicle, it is possible to allow the driver to comfortably take the rest in the autonomous traveling situation, and furthermore, to block the misoperation of the pedal in the autonomous traveling situation to improve safety through the configuration in which the accelerator pedal apparatus and the brake pedal apparatus are moved to the right and left of the dash panel and hidden, respectively, and then, are in the hidden states of being inoperable by the driver in the autonomous traveling situation, and the accelerator pedal apparatus and the brake pedal apparatus are moved to be gathered to the center of the dash panel and exposed, respectively, and then, in the popped-up states of being operable by the driver in the manual driving mode.

Further, according to the foldable pedal apparatus for the vehicle according to the present disclosure, it is possible to reduce the number of parts, save the cost, and largely reduce the size of the appearance compared to the rotary foldable structure through the configuration in which the accelerator pedal apparatus and the brake pedal apparatus are horizontally slid and moved with respect to the dash panel to be hidden and popped-up, respectively.

Further, according to the foldable pedal apparatus for the vehicle, it is possible to allow the driver to comfortably operate the accelerator pedal apparatus as much as possible, thereby improving operability through the configuration capable of horizontally, finely adjusting the location of the accelerator pedal apparatus in the popped-up state.

Further, according to the foldable pedal apparatus for the vehicle according to the present disclosure, it is possible to secure the vehicle interior space and the space of the engine room as much as possible through the configuration capable of minimizing the hidden spaces of the accelerator pedal apparatus and the brake pedal apparatus in the hidden state.

Further, according to the foldable pedal apparatus for the vehicle according to the present disclosure, it is possible to prevent the driver's injury due to the accelerator pedal apparatus and the brake pedal apparatus upon occurrence of collision accidents through the configuration of forcibly moving the accelerator pedal apparatus and the brake pedal apparatus to the console side hidden space at the right thereof and the door side hidden space at the left thereof to be in the hidden states when large collision accidents by which the airbags of the vehicle are operated occur.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
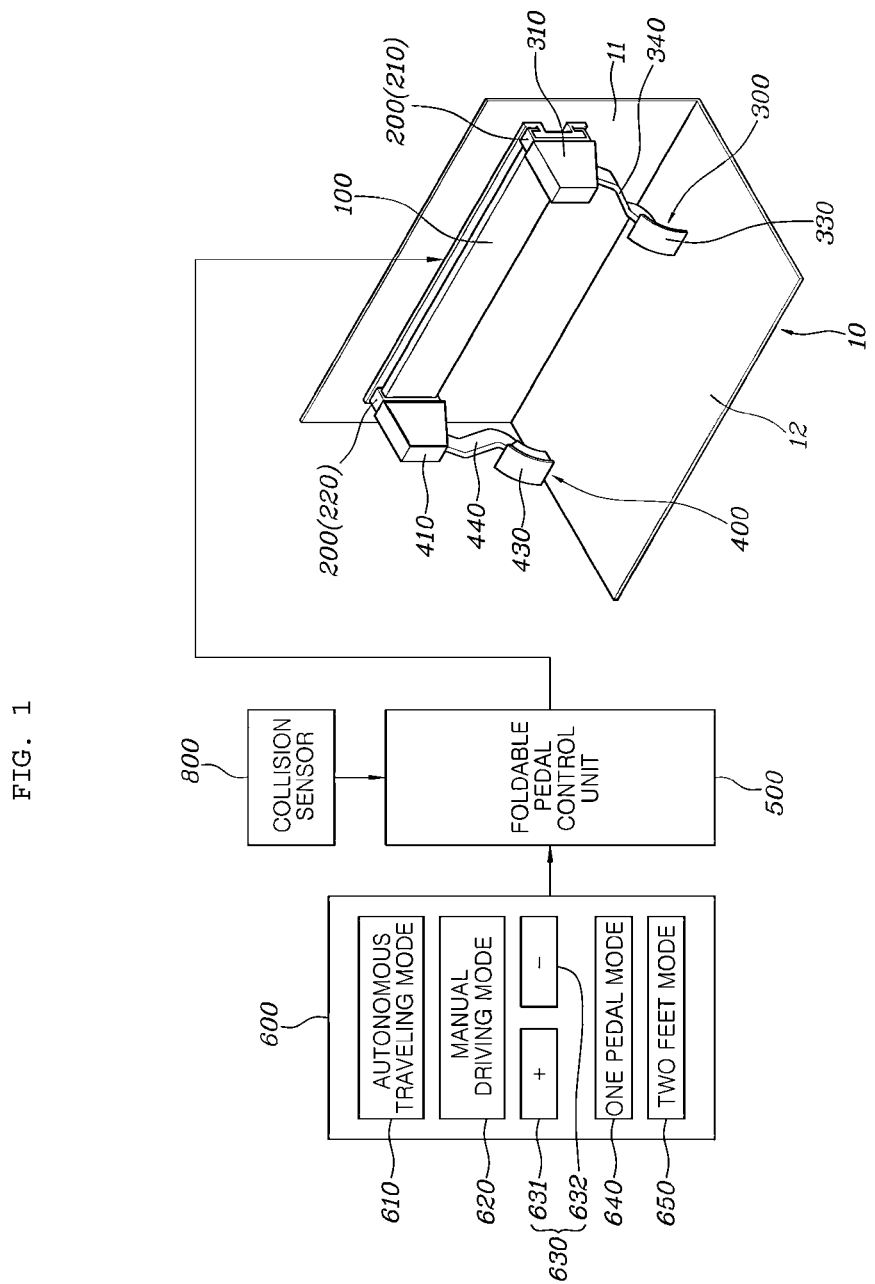
FIGS. 1 and 2 are diagrams showing a state where an accelerator pedal apparatus and a brake pedal apparatus are moved to the left and right of a dash panel to be hidden, as a foldable pedal apparatus according to an exemplary embodiment of the present disclosure.

Specific structural to functional descriptions of the exemplary embodiments of the present disclosure disclosed in the present specification or application are only illustrated for the purpose of describing the exemplary embodiments according to the present disclosure, and the exemplary embodiments according to the present disclosure may be embodied in various forms and it should not be construed that the present disclosure is limited to the exemplary embodiments described in the present specification or application.

Since the embodiments according to the present disclosure may be variously changed and have various forms, specific exemplary embodiments will be illustrated in the drawings and described in detail in the present specification or application. However, this is not intended to limit the exemplary embodiments according to the concept of the present disclosure to a particular disclosed form, and it should be understood that the present disclosure includes all changes, equivalents, and substitutes included in the spirit and scope of the present disclosure.

Terms such as first and/or second may be used to describe various components, but the components should not be limited by the terms. The terms are used only for the purpose of distinguishing one component from another, and for example, without departing from the scope according to the concept of the present disclosure, the first component may be named a second component, and similarly, the second component may also be named the first component.

When a component is referred to as being "connected" or "coupled" to another component, the component may be directly connected or coupled to another component, but it should be understood that other components may also be present between the components. On the other hand, when a component is referred to as being "directly connected" or "directly coupled" to another component, it should be understood that there are no other components between the components. Other expressions which describe the relationship between the components, that is, "between" and "immediately between" or "neighboring" and "directly neighboring to" should be interpreted in the same manner.

The terminology used in the present specification is merely for the purpose of describing particular exemplary embodiments, and is not intended to limit the present disclosure. The singular forms may include plural forms unless the contexts clearly indicate the opposite. In the present specification, it may be understood that the term "comprising", "having", or the like specifies the presence of the characteristic, integer, step, operation, component, part, or a combination thereof described, and does not exclude the presence or addition possibility of one or more other characteristics, integers, steps, operations, components, parts, or combinations thereof in advance.

Unless defined otherwise, all terms including technical terms or scientific terms used herein have the same meaning as commonly understood by those skilled in the art to which the present disclosure pertains. The terms defined in the dictionary commonly used may be interpreted as having a meaning consistent with the meaning in the context of the related technology, and may not be interpreted as an ideal or excessively formal meaning, unless clearly defined in the present specification.

A control unit (controller) according to the exemplary embodiment of the present disclosure can be implemented through a non-volatile memory (not shown) configured to store data relating to an algorithm configured to control the operation of various components of a vehicle or software instructions for reproducing the algorithm and a processor (not shown) configured to perform operations described below using data stored in the corresponding memory. Here, the memory and the processor can be implemented as separate chips. Alternatively, the memory and the processor can be implemented as a single chip integrated with each other. The processor can take the form of one or more processors.

Hereinafter, a foldable pedal apparatus for a vehicle according to a preferred exemplary embodiment of the present disclosure will be described with reference to the accompanying drawings.

As shown in FIGS. 1 to 10, a foldable pedal apparatus for a vehicle according to the present disclosure includes a stator 100 of a linear motor coupled to a vertical part 11 of a dash panel 10 to extend horizontally and serving as a guide for guiding the movement; a mover 200 of the linear motor coupled to the stator 100 of the linear motor and horizontally moving along the stator 100 of the linear motor when a current is applied; and an accelerator pedal apparatus 300 and a brake pedal apparatus 400 coupled to the mover 200 of the linear motor to move together with the mover 200 of the linear motor.

The dash panel 10 is located in a space under a driver's seat, and the accelerator pedal apparatus 300 and the brake pedal apparatus 400 are installed on the vertical part 11 of the dash panel 10 in a pendant type.

The linear motor is provided with the stator 100 and the mover 200, in which the stator 100 of the linear motor is installed on the vertical part 11 of the dash panel 10 to extend horizontally, and the mover 200 of the linear motor is coupled to the stator 100 of the linear motor, and horizontally slides and moves along the stator 100 of the linear motor when the current is applied to a coil of the stator 100 of the linear motor.

The mover 200 of the linear motor is composed of an accelerator pedal mover 210 coupled to the accelerator pedal apparatus 300, and a brake pedal mover 220 coupled to the brake pedal apparatus 400, and the accelerator pedal mover 210 and the brake pedal mover 220 have a configuration of being independently operated by a control of a foldable pedal control unit 500.

The accelerator pedal apparatus 300 and the brake pedal apparatus 400 according to the present disclosure include pedal housings 310, 410 coupled to the mover 200 of the linear motor, pedal arms 340, 440 having upper ends rotatably coupled to the pedal housings 310, 410 around hinge pins 320, 420 and pedal pads 330, 430 provided on lower ends, permanent magnets 350, 450 coupled to upper portions of the pedal arms 340, 440, and PCBs 360, 460 fixed to the pedal housings 310, 410 to face the permanent magnets 350, 450, and generating pedal function-related signals through changes in magnetic flux according to changes in locations of the permanent magnets 350, 450 upon rotation of the pedal arms 340, 440, respectively.

The pedal housings 310, 410 are formed in a hollow box shape and have opened one sides, and covers 370, 470 are coupled to the opened one sides.

The pedal housing 310 of the accelerator pedal apparatus 300 is coupled to the accelerator pedal mover 210 of the mover 200 of the linear motor, and the pedal housing 410 of the brake pedal apparatus 400 is coupled to the brake pedal mover 220 of the mover 200 of the linear motor.

The pedal arms 340, 440 are rotated around the hinge pins 320, 420 forward or backward, two permanent magnets 350, 450 are coupled to portions to which the hinge pins 320, 420 are coupled on upper ends of the pedal arms 340, 440, and the two permanent magnets 350, 450 are to enhance safety of the signals and two or more permanent magnets 350, 450 can also be provided.

A pedal function-related signal generated by the PCB 360 of the accelerator pedal apparatus 300 is a signal related to acceleration, and a pedal function-related signal generated by the PCB 460 of the brake pedal apparatus 400 is a signal related to braking.

The pedal arm 340 of the accelerator pedal apparatus 300 and the pedal arm 440 of the brake pedal apparatus 400 have a structure of having the upper sides connected to the pedal housings 310, 410 opened and bent to the outsides in opposite directions and installed to be symmetrical left and right (e.g., in a lateral direction).

As described above, when the pedal arms 340, 440 are formed to be opened in opposite directions and installed to be symmetrical left and right, it is possible to prevent a misoperation phenomenon in which a driver simultaneously depresses and operates the pedal arm 340 of the accelerator pedal apparatus 300 and the pedal arm 440 of the brake pedal apparatus 400 as much as possible when the accelerator pedal apparatus 300 and the brake pedal apparatus 400 are in the popped-up states.

Figure 2:
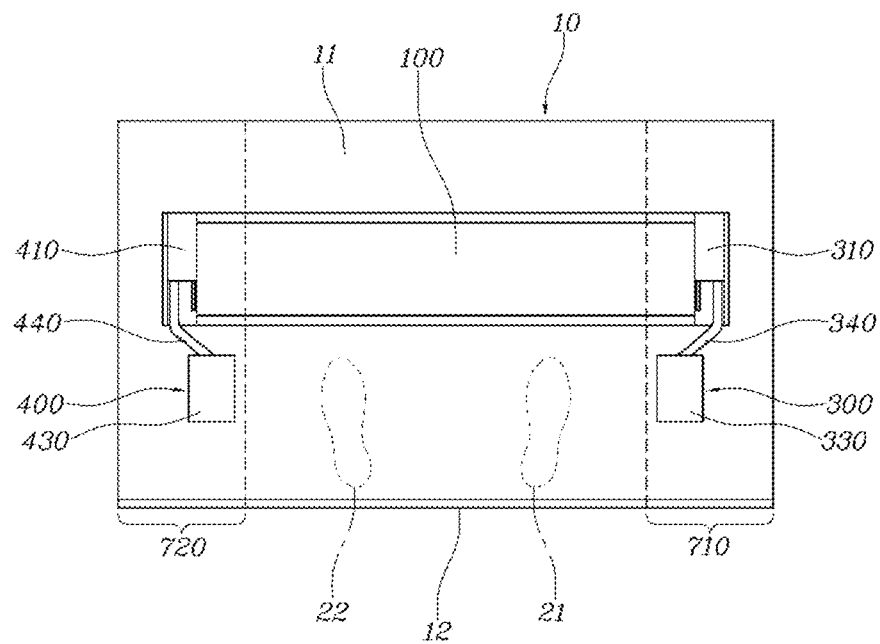

According to the foldable pedal apparatus according to the present disclosure, when the accelerator pedal apparatus 300 and the brake pedal apparatus 400 are moved to the right and the left along the stator 100 of the linear motor and spaced apart from each other as far as possible, respectively, the accelerator pedal apparatus 300 and the brake pedal apparatus 400 are in the hidden states of being inoperable by the driver (see FIGS. 1 and 2).

In other words, when the driver operates an autonomous traveling mode switch 610 among the components of a mode switch 600 to generate an autonomous traveling mode signal, a current is applied to the linear motor by the control of the foldable pedal control unit 500 and the accelerator pedal mover 210 and the brake pedal mover 220 are moved to the right and the left along the stator 100 of the linear motor, respectively, and then, the accelerator pedal apparatus 300 is moved to the right and located in a console side hidden space 710, the brake pedal apparatus 400 is moved to the left and located in the door side hidden space 720, the accelerator pedal apparatus 300 and the brake pedal apparatus 400 are spaced apart from each other as far as possible, and then, the accelerator pedal apparatus 300 and the brake pedal apparatus 400 are in the hidden states of being inoperable by the driver.

As described above, when the accelerator pedal apparatus 300 and the brake pedal apparatus 400 are moved to the right and the left to be in the hidden states, respectively, as the space under the driver's seat becomes a wide space without interfering with the pedal, the driver can comfortably take the rest in a relax mode in a state of locating a right foot 21 and a left foot 22 of the driver between the accelerator pedal apparatus 300 and the brake pedal apparatus 400, and further, it is possible to block the misoperation of the pedal in the autonomous traveling situation, thereby improving safety.

Further, it is possible to minimize the hidden spaces of the accelerator pedal apparatus 300 and the brake pedal apparatus 400 in the hidden states, thereby securing a vehicle interior space and a space of an engine room as much as possible.

Figure 3:
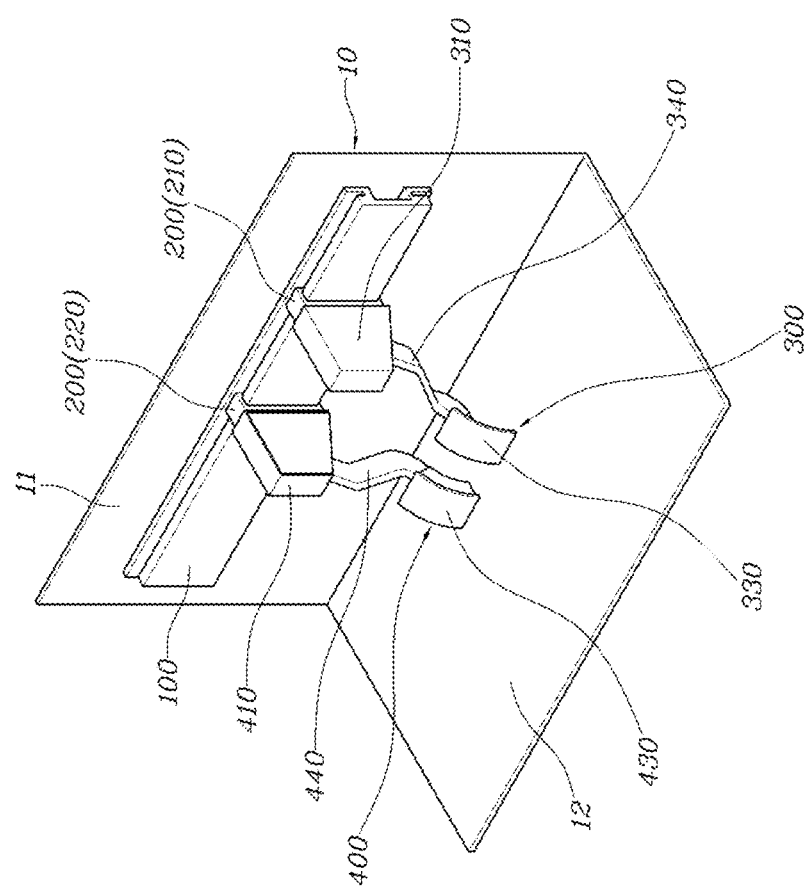
FIGS. 3 and 4 are diagrams showing a state where the accelerator pedal apparatus and the brake pedal apparatus according to an exemplary embodiment of the present disclosure are moved to the center of the dash panel to be popped up.
Figure 4:
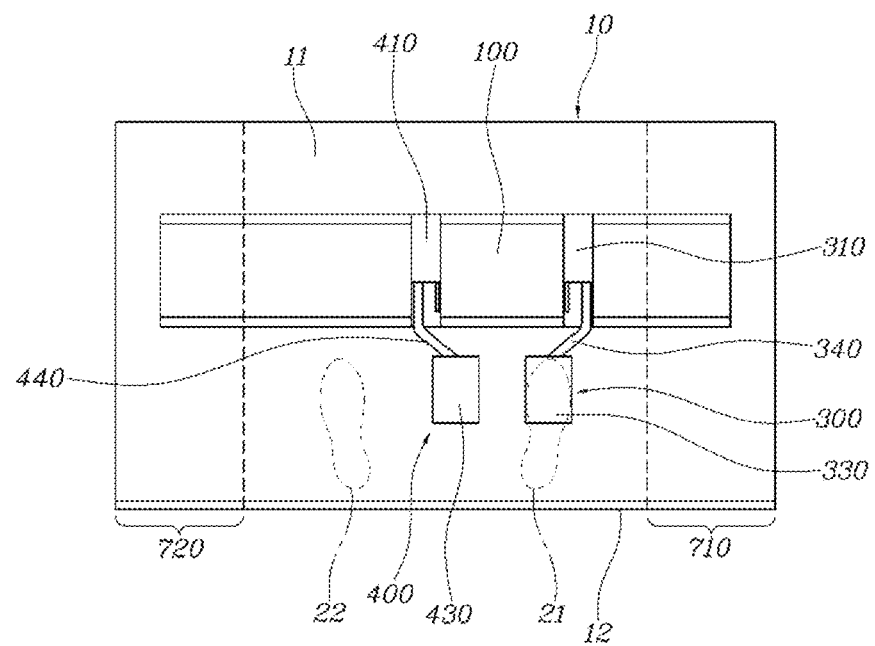
Figure 5:
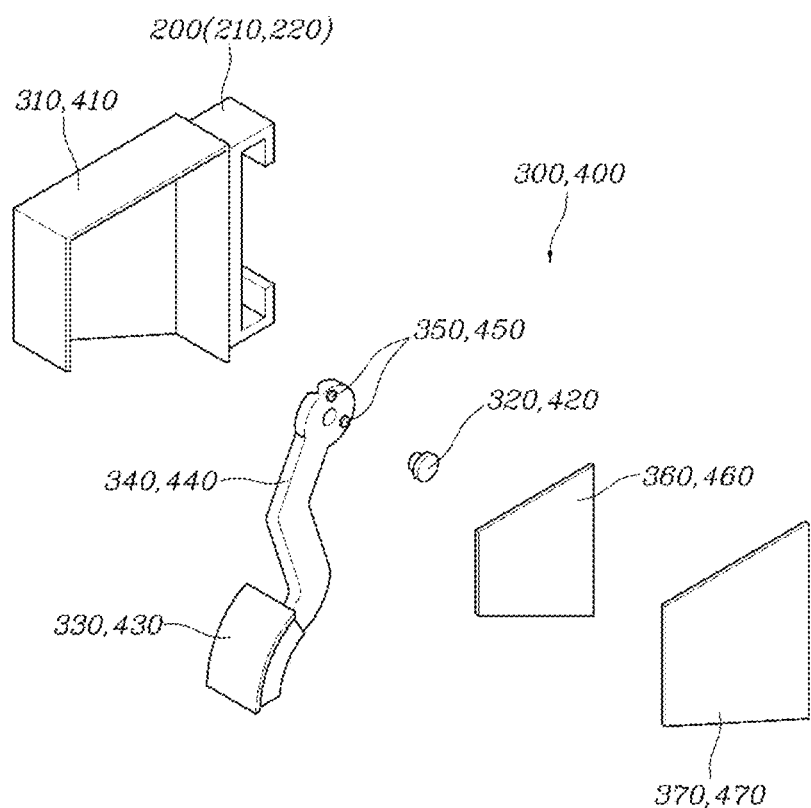
FIG. 5 is an exploded diagram of the accelerator pedal apparatus and the brake pedal apparatus according to an exemplary embodiment of the present disclosure.
Figure 6:
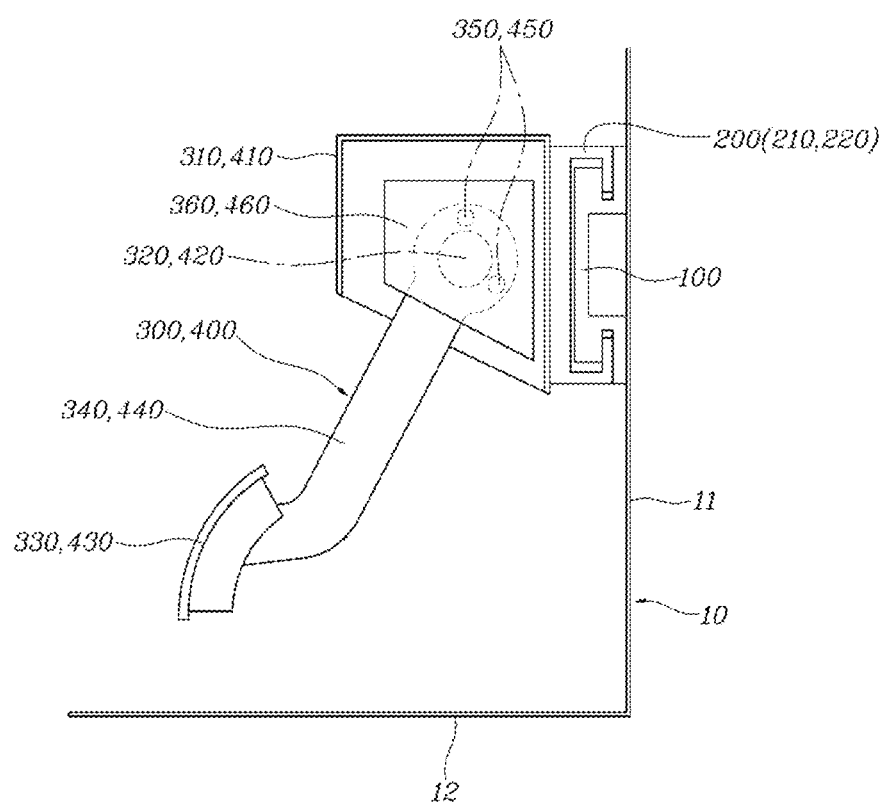
FIG. 6 is a side diagram showing a state where the accelerator pedal apparatus and the brake pedal apparatus according to an exemplary embodiment of the present disclosure are installed.

Further, according to the foldable pedal apparatus according to the present disclosure, when the accelerator pedal apparatus 300 and the brake pedal apparatus 400 are moved to the left and the right along the stator 100 of the linear motor, respectively, and gathered to be close to each other, the accelerator pedal apparatus 300 and the brake pedal apparatus 400 are in the popped-up states of being operable by the driver (see FIGS. 3 and 4).

In other words, when the driver operates a manual driving mode switch 620 among the components of the mode switch 600 to generate a manual driving mode signal, the current is applied to the linear motor by the control of the foldable pedal control unit 500 and the accelerator pedal mover 210 and the brake pedal mover 220 are moved to the left and the right along the stator 100 of the linear motor, respectively, and the accelerator pedal mover 210 and the brake pedal mover 220 moved to the left and the right are moved up to pre-memorized locations and then their locations are fixed thereto, and then, the accelerator pedal apparatus 300 and the brake pedal apparatus 400 are in the popped-up states of being operable by the driver.

For example, the autonomous traveling mode switch 610 and the manual traveling mode switch 620 can be formed of one traveling mode switch 610, 620, and when the driver presses the traveling mode switch in the autonomous traveling mode state, it is switched to the manual traveling mode and the accelerator pedal apparatus 300 and the brake pedal apparatus 400 can be in the popped-up states of being operable by the driver, and when the driver presses the traveling mode switch in the manual traveling mode state, it is switched to the autonomous traveling mode and the accelerator pedal apparatus 300 and the brake pedal apparatus 400 can be in the hidden states of being inoperable by the driver.

As described above, when the accelerator pedal apparatus 300 and the brake pedal apparatus 400 are moved to the left and the right to be in the popped-up states, respectively, the driver can normally operate the accelerator pedal apparatus 300 and the brake pedal apparatus 400 using the right foot 21.

The movement up to the pre-memorized locations when the accelerator pedal apparatus 300 and the brake pedal apparatus 400 are moved to be in the popped-up state is a case where there is no pressure sensor, and the movement of the accelerator pedal apparatus 300 and the brake pedal apparatus 400 up to the memorized locations can be done by the control of the foldable pedal control unit 500, and as a similar example, there is a memory seat.

According to the foldable pedal apparatus according to the present disclosure, it is possible to reduce the number of parts, save the cost, and largely reduce the size of the appearance compared to the rotary foldable structure through the configuration in which the accelerator pedal apparatus 300 and the brake pedal apparatus 400 are horizontally slid and moved with respect to the dash panel 10 to be in the hidden and popped-up states, respectively.

As shown in FIGS. 3 and 4, when the accelerator pedal apparatus 300 is in the popped-up state, the driver can operate a fine adjustment switch 630 among the components of the mode switch 600 to move the accelerator pedal apparatus 300 to the right or the left, and then, the driver can comfortably operate the accelerator pedal apparatus 300 as much as possible, thereby improving operability.

The fine adjustment switch 630 includes a plus switch 631 and a minus switch 632, and for example, when operating the plus switch 631, the driver can finely move the accelerator pedal apparatus 300 to the right to adjust the location thereof, and when operating the minus switch 632, the driver can finely move the accelerator pedal apparatus 300 to the left to adjust the location thereof, and this can also be reversely configured as necessary.

When the location of the accelerator pedal apparatus 300 is adjusted by operating the fine adjustment switch, the location of the brake pedal apparatus 400 can be set to move to a location spaced apart by an interval set to the left from the accelerator pedal apparatus 300.

Figure 7:
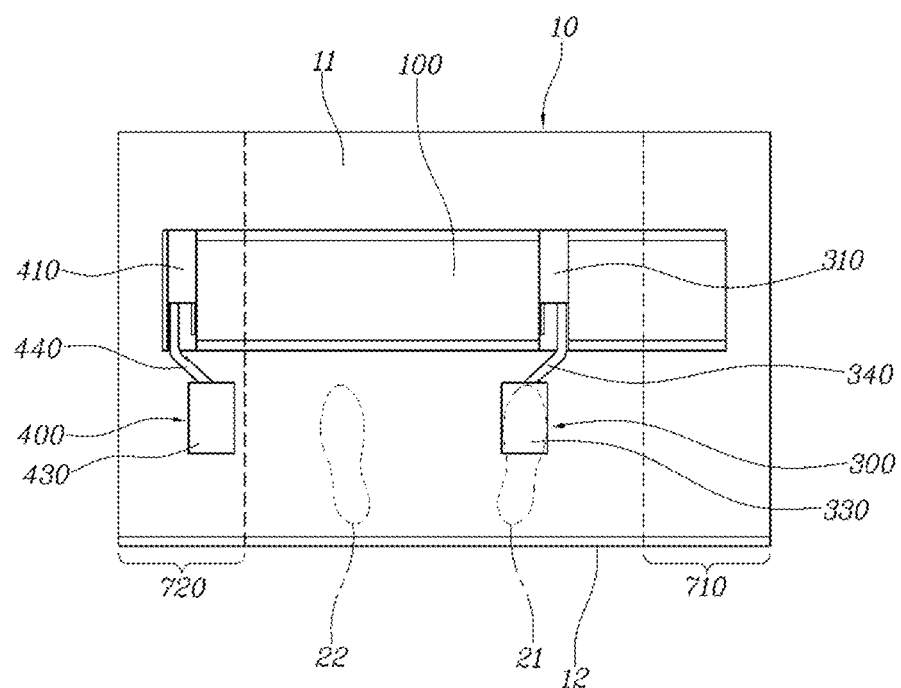
FIGS. 7 and 8 are diagrams in a one pedal mode and a two feet mode according to an exemplary embodiment of the present disclosure.

As shown in FIGS. 3 and 4, when the driver operates the one pedal switch 640 among the components of the mode switch 600 to generate a one pedal mode signal in the state where the accelerator pedal apparatus 300 and the brake pedal apparatus 400 are popped up, as shown in FIG. 7, the brake pedal apparatus 400 is moved to the door side hidden space 720 at the left thereof to be in the hidden state of being inoperable by the driver, and the accelerator pedal apparatus 300 is moved to the pre-memorized location and fixed thereto, and then, in the popped-up state of being operable by the driver.

As described above, when only the accelerator pedal apparatus 300 is popped up and an accelerator one pedal mode is executed, the driver operates only the popped-up accelerator pedal apparatus 300 with the right foot 21 to perform the acceleration and braking of the vehicle, and in other words, the acceleration of the vehicle is executed when the driver operates only the accelerator pedal apparatus 300, and the braking by the deceleration is executed when the operation force is released by the accelerator pedal apparatus 300.

Conversely, when only the brake pedal apparatus 400 is popped up and a brake one pedal mode is executed, the driver operates only the popped-up brake pedal apparatus 400 to perform the acceleration and braking of the vehicle, and at this time, braking is executed when the brake pedal apparatus 400 is operated, and when the operation force is released by the brake pedal apparatus 300, the acceleration of the vehicle can be executed.

Figure 8:
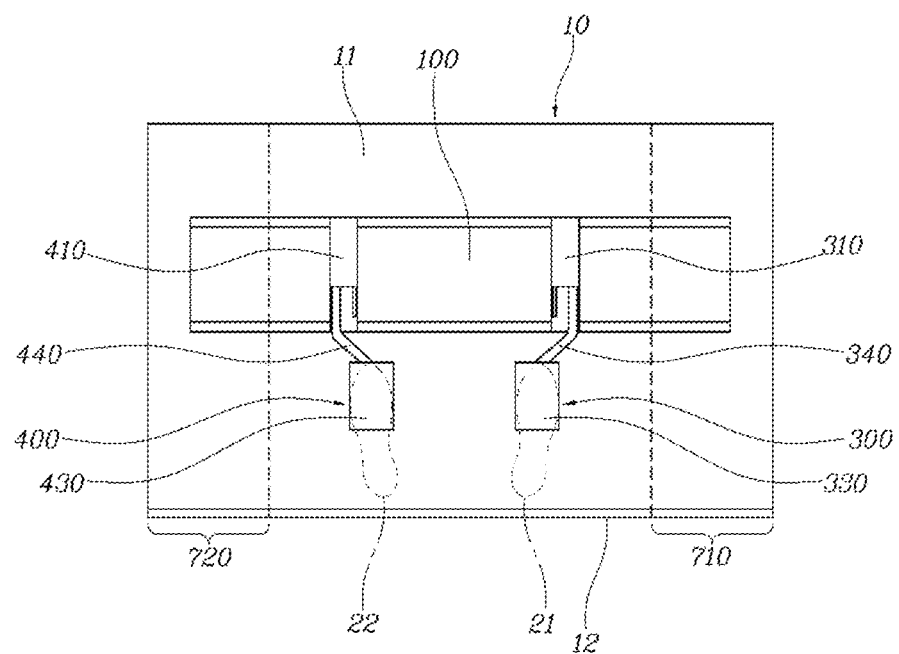

As shown in FIGS. 3 and 4, when the driver operates the two feet mode switch 650 among the components of the mode switch 600 to generate a two feet mode signal in the state where the accelerator pedal apparatus 300 and the brake pedal apparatus 400 are popped up, as shown in FIG. 8, the accelerator pedal apparatus 300 and the brake pedal apparatus 400 are moved to the left and the right up to the pre-memorized locations and fixed thereto, respectively and then, in the popped-up states of being operable by the driver.

As shown in FIG. 8, when the two feet mode is executed, the driver can operate the accelerator pedal apparatus 300 using the right foot 21, and normally operate the brake pedal apparatus 400 using the left foot 22.

Upon executing the two feet mode, the movement up to the pre-memorized locations when the accelerator pedal apparatus 300 and the brake pedal apparatus 400 are moved to be in the popped-up states is a case where there is the pressure sensor, and the movement of the accelerator pedal apparatus 300 and the brake pedal apparatus 400 up to the memorized location can be done by the control of the foldable pedal control unit 500, and as a similar example, there is the memory seat.

The mode switch 600 including the autonomous traveling mode switch 610, the manual driving mode switch 620, the fine adjustment switch 630, the one pedal mode switch 640, and the two feet mode switch 650 can be installed around the driver's seat for the driver's easy operation, and can be configured to be located on the driver's seat as necessary in the autonomous vehicle.

According to the foldable pedal apparatus according to the present disclosure, when a collision signal for operating the airbags of the vehicle is generated, the accelerator pedal apparatus 300 and the brake pedal apparatus 400 are moved to and located in the console side hidden space 710 at the right and the door side hidden space 720 at the left, respectively, by the control of the foldable pedal control unit 500 (in the same state as in FIG. 2), and then, the accelerator pedal apparatus 300 and the brake pedal apparatus 400 can be in the hidden states of being inoperable by the driver, thereby preventing the driver's injury due to the accelerator pedal apparatus 300 and the brake pedal apparatus 400 upon collision accidents.

The foldable pedal apparatus according to the present disclosure can be configured so that the collision signal can be delivered from a collision sensor 800 of the vehicle to the foldable pedal control unit 500 or a signal of the collision sensor 800 is delivered to the foldable pedal control unit 500 through a vehicle control unit.

When the accelerator pedal apparatus 300 and the brake pedal apparatus 400 are pushed toward the driver in the state of being pupped-up upon occurrence of large collision accidents by which the airbags of the vehicle are operated, the driver's legs are hit by the accelerator pedal apparatus 300 and the brake pedal apparatus 400 and largely injured.

To prevent such a situation, according to the exemplary embodiment of the present disclosure, when large collision accidents by which the airbags of the vehicle are operated occur, the accelerator pedal apparatus 300 and the brake pedal apparatus 400 are forcibly moved to the console side hidden space 710 at the right and the door side hidden space 720 at the left to be in the hidden states, and thereafter, even if the accelerator pedal apparatus 300 and the brake pedal apparatus 400 are pushed toward the interior due to occurrence of the collision accidents, they can be spaced apart from the driver's legs, thereby preventing the driver's injury due to the accelerator pedal apparatus 300 and the brake pedal apparatus 400.

Figure 9:
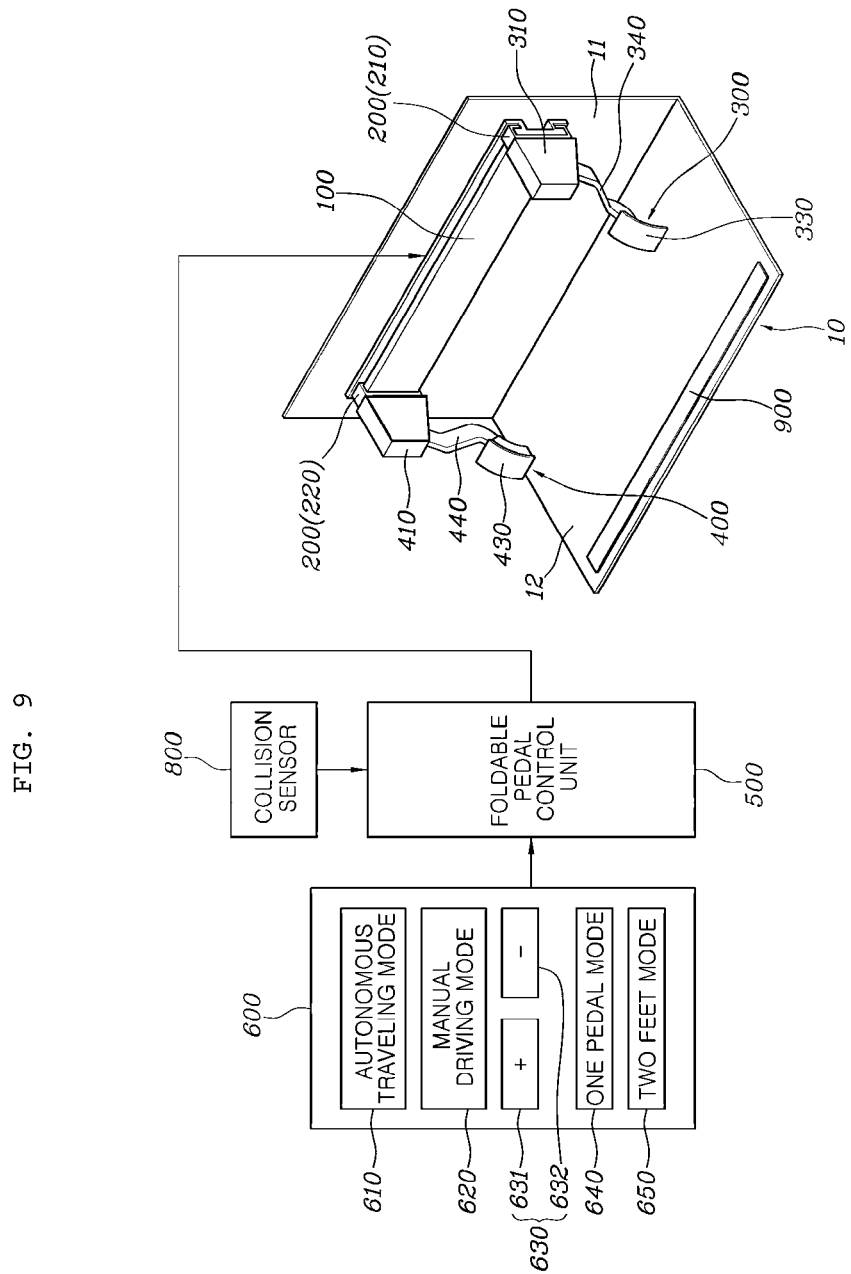
FIGS. 9 and 10 are diagrams showing an exemplary embodiment of the present disclosure in which a pressure sensor is installed on the dash panel.
Figure 10:
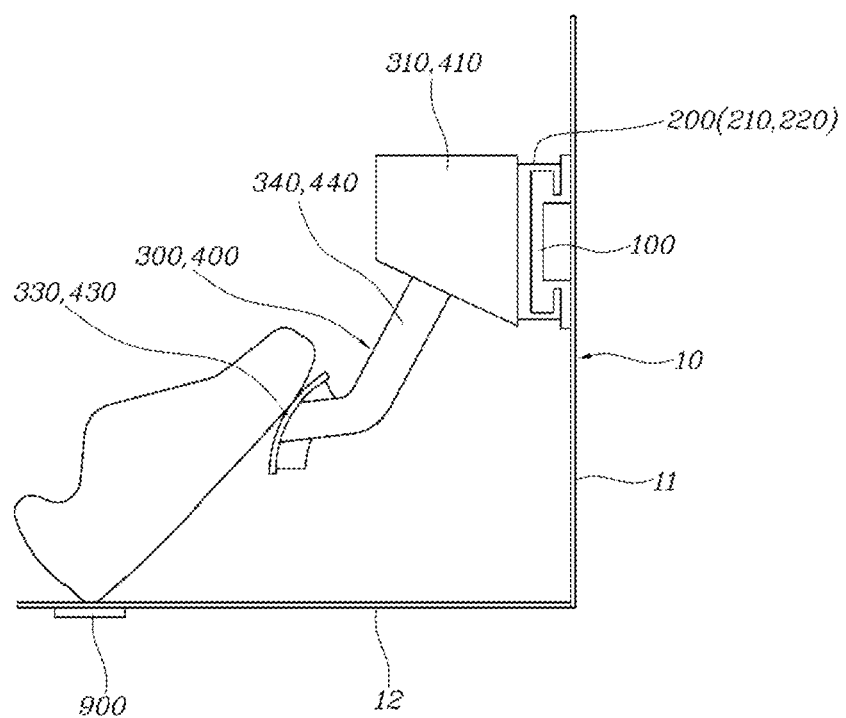

FIG. 9 shows the exemplary embodiment in which the pressure sensor 900 is installed on the horizontal part 12 of the dash panel 10, and when the driver depresses the horizontal part 12 of the dash panel 10 with the foot to apply a load of a certain level or more to the pressure sensor 900, a pressure sensor signal is generated.

As described above, if the pressure sensor 900 is installed on the horizontal part 12 of the dash panel 10, when the driver operates the autonomous traveling mode switch 610 to generate the autonomous traveling mode signal, the accelerator pedal apparatus 300 is moved to the right and located in the console side hidden space 710 by the control of the foldable pedal control unit 500, and the brake pedal apparatus 400 is moved to the left and located in the door side hidden space 720, and then, the accelerator pedal apparatus 300 and the brake pedal apparatus 400 are in the hidden states of being inoperable by the driver. Therefore, this operation is the same as that of the case where there is no pressure sensor.

Further, if the pressure sensor 900 is installed on the horizontal part 12 of the dash panel 10, in the states where the accelerator pedal apparatus 300 and the brake pedal apparatus 400 are hidden as shown in FIGS. 1 and 2, the driver operates the manual driving mode switch 620 to generate the manual driving mode signal, and pressurizes the pressure sensor 900 with the driver's foot to generate the pressure sensor signal.

As described above, when the manual driving mode signal and the pressure sensor signal are generated, the brake pedal apparatus 400 is moved to the right up to a location where the pressure sensor signal is generated and fixed thereto, and the accelerator pedal apparatus 300 is moved to the left up to a location spaced apart from the brake pedal apparatus 400 by a certain distance and fixed thereto, and then, the accelerator pedal apparatus 300 and the brake pedal apparatus 400 are in the popped-up states of being operable by the driver, and at this time, the driver can normally operate the accelerator pedal apparatus 300 and the brake pedal apparatus 400 using the right foot.

Meanwhile, in the state where the brake pedal apparatus is popped-up or hidden, if the driver does not operate the manual driving mode switch 620 and the manual driving mode signal is not generated, and pressurizes the pressure sensor 900 with the driver's foot to generate only the pressure sensor signal, the brake pedal apparatus 400 is not moved to the location where the pressure sensor signal is generated and maintains the current location, and therefore, the locations of the accelerator pedal apparatus 300 and the brake pedal apparatus 400 are not changed.

Further, if the pressure sensor 900 is installed on the horizontal part 12 of the dash panel 10, in the state where the accelerator pedal apparatus 300 and the brake pedal apparatus 400 are popped up, when the driver operates the two feet mode switch 650 to generate the two feet mode signal, and pressurizes the pressure sensor 900 with the driver's foot to generate the pressure sensor signal, the accelerator pedal apparatus 300 and the brake pedal apparatus 400 are moved up to the location where the pressure sensor signal is generated by the right foot 21 and the left foot 22 and fixed thereto, respectively, and then, the accelerator pedal apparatus 300 and the brake pedal apparatus 400 are in the popped-up states of being operable by the driver.

As described above, according to the foldable pedal apparatus according to the present disclosure, it is possible to allow the driver to comfortably take the rest in the autonomous traveling situation, and furthermore, to block the misoperation of the pedal in the autonomous traveling situation to improve safety through the configuration in which the accelerator pedal apparatus 300 and the brake pedal apparatus 400 are moved to the right and left of the dash panel 10 and hidden, respectively, and then, in the hidden states of being inoperable by the driver in the autonomous traveling situation, and the accelerator pedal apparatus 300 and the brake pedal apparatus 400 are moved to be gathered to the center of the dash panel 10 and exposed, respectively, and then, in the popped-up states of being operable by the driver in the manual driving mode.

Further, according to the foldable pedal apparatus for the vehicle according to the present disclosure, it is possible to reduce the number of parts, save the cost, and largely reduce the size of the appearance compared to the rotary foldable structure through the configuration in which the accelerator pedal apparatus 300 and the brake pedal apparatus 400 are horizontally slid and moved with respect to the dash panel 10 to be hidden and popped-up, respectively.

Further, according to the foldable pedal apparatus for the vehicle, it is possible to allow the driver to comfortably operate the accelerator pedal apparatus 300 as much as possible, thereby improving operability through the configuration capable of horizontally, finely adjusting the location of the accelerator pedal apparatus 300 in the popped-up state.

Further, according to the foldable pedal apparatus for the vehicle according to the present disclosure, it is possible to secure the vehicle interior space and the space of the engine room as much as possible through the configuration capable of minimizing the hidden spaces of the accelerator pedal apparatus 300 and the brake pedal apparatus 400 in the hidden state.

Further, according to the foldable pedal apparatus for the vehicle according to the present disclosure, it is possible to prevent the driver's injury due to the accelerator pedal apparatus 300 and the brake pedal apparatus 400 upon occurrence of collision accidents as much as possible through the configuration of forcibly moving the accelerator pedal apparatus 300 and the brake pedal apparatus 400 to the console side hidden space 710 at the right thereof and the door side hidden space 720 at the left thereof to be in the hidden states when large collision accidents by which the airbags of the vehicle are operated occur.

While the present disclosure has been shown and described with reference to the specific exemplary embodiment, it will be apparent to those skilled in the art that the present disclosure can be variously improved and modified without departing from the technical spirit of the present disclosure provided by the appended claims.

What is claimed is:

1. A foldable pedal apparatus for a vehicle comprising:
an accelerator pedal apparatus and a brake pedal apparatus; and
a linear motor including:
a stator coupled to a vertical part of a dash panel, the stator extending horizontally and serving as a guide for guiding movement; and
an accelerator pedal mover and a brake pedal mover coupled to the stator and horizontally movable along the stator when a current is applied to the stator,
wherein the accelerator pedal apparatus and the brake pedal apparatus are coupled to and horizontally movable with the accelerator and brake pedal movers, respectively.

2. The foldable pedal apparatus of claim 1,
wherein the accelerator pedal mover and the brake pedal mover are configured to independently operate.

3. The foldable pedal apparatus of claim 1,
wherein, when the accelerator pedal apparatus and the brake pedal apparatus are moved towards first and second sides, away from each other, along the stator, respectively, and spaced apart from each other as far as possible within a predetermined movable range thereof, the accelerator pedal apparatus and the brake pedal apparatus are in hidden states in which a driver cannot operate the accelerator pedal apparatus and the brake pedal apparatus, respectively.

4. The foldable pedal apparatus of claim 3,
wherein, when the accelerator pedal apparatus and the brake pedal apparatus are moved towards the second and first sides, towards each other, along the stator, respectively, and gathered to be closer to each other, the accelerator pedal apparatus and the brake pedal apparatus are in popped-up states in which the driver can operate the accelerator pedal apparatus and the brake pedal apparatus, respectively.

5. The foldable pedal apparatus of claim 4,
wherein, when an autonomous traveling mode signal is generated in the popped-up states of the accelerator pedal apparatus and the brake pedal apparatus, the accelerator pedal apparatus and the brake pedal apparatus are moved to and located in a console side hidden space at the first side and a door side hidden space at the second side, respectively, and then, the accelerator pedal apparatus and the brake pedal apparatus are in the hidden states of being inoperable by the driver.

6. The foldable pedal apparatus of claim 4,
wherein, when a manual driving mode signal is generated in the hidden states of the accelerator pedal apparatus and the brake pedal apparatus, the accelerator pedal apparatus and the brake pedal apparatus are moved towards the second side and the first side, toward each other, up to pre-memorized locations and fixed thereto, respectively, and then, the accelerator pedal apparatus and the brake pedal apparatus are in the popped-up states of being operable by the driver.

7. The foldable pedal apparatus of claim 4, further comprising: a pressure sensor coupled to a horizontal part of the dash panel,
wherein, when a manual driving mode signal and a pressure sensor signal are generated in the hidden states of the accelerator pedal apparatus and the brake pedal apparatus, the brake pedal apparatus is moved towards the first side up to a location, where the pressure sensor signal is generated, and fixed thereto, and the accelerator pedal apparatus is moved towards the second side up to a location spaced apart from the brake pedal apparatus by a certain distance and fixed thereto, and then, the accelerator pedal apparatus and the brake pedal apparatus are in the popped-up states of being operable by the driver.

8. The foldable pedal apparatus of claim 7,
wherein the pressure sensor signal is generated when the driver depresses the horizontal part of the dash panel with a foot to apply a load of a certain level or more to the pressure sensor.

9. The foldable pedal apparatus of claim 7,
wherein, when the manual driving mode signal is not generated and only the pressure sensor signal is generated in the popped-up state or the hidden state of the brake pedal apparatus, the brake pedal apparatus is not moved to the location where the pressure sensor signal is generated and maintains a current location.

10. The foldable pedal apparatus of claim 4,
wherein, when the driver operates a fine adjustment switch in the popped-up state of the accelerator pedal apparatus, the accelerator pedal apparatus is adjusted to be moved towards the first side or the second side.

11. The foldable pedal apparatus of claim 4,
wherein, when the driver operates a one pedal mode switch in the popped-up states of the accelerator pedal apparatus and the brake pedal apparatus, the brake pedal apparatus is moved to a door side hidden space at the second side, and then, is in the hidden state of being inoperable by the driver, and the accelerator pedal apparatus is moved to a pre-memorized location and fixed thereto, and then, is in the popped-up state of being operable by the driver.

12. The foldable pedal apparatus of claim 4,
wherein, when the driver operates a two feet mode switch in the popped-up states of the accelerator pedal apparatus and the brake pedal apparatus, the accelerator pedal apparatus and the brake pedal apparatus are moved towards the second side and the first side up to pre-memorized locations and fixed thereto, respectively, and then, the accelerator pedal apparatus and the brake pedal apparatus are in the popped-up states of being operable by the driver.

13. The foldable pedal apparatus of claim 4, further comprising: a pressure sensor coupled to a horizontal part of the dash panel,
wherein, when a two feet mode signal and a pressure sensor signal are generated in the popped-up states of the accelerator pedal apparatus and the brake pedal apparatus, the accelerator pedal apparatus and the brake pedal apparatus are moved up to locations where the pressure sensor signal is generated by a right foot and a left foot and fixed thereto, respectively, and then, the accelerator pedal apparatus and the brake pedal apparatus are in the popped-states of being operable by the driver.

14. The foldable pedal apparatus of claim 3,
wherein, when a collision signal for operating airbags of the vehicle is generated, the accelerator pedal apparatus and the brake pedal apparatus are moved to and located in a console side hidden space at the first side and a door side hidden space at the second side, respectively, and then, the accelerator pedal apparatus and the brake pedal apparatus are in the hidden states of being inoperable by the driver, thereby preventing the driver's injury due to the accelerator pedal apparatus and the brake pedal apparatus upon collision accidents.

15. The foldable pedal apparatus of claim 1,
wherein each of the accelerator pedal apparatus and the brake pedal apparatus comprises: a pedal housing coupled to a respective one of the accelerator and brake pedal movers;
a pedal arm having an upper end rotatably coupled to the pedal housing and a lower end coupled to a pedal pad;
a permanent magnet coupled to an upper portion of the pedal arm; and
a printed circuit board (PCB) fixed to the pedal housing to face the permanent magnet, and generating a pedal function-related signal through a change in magnetic flux depending upon a change in location of the permanent magnet upon rotation of the pedal arm.

16. The foldable pedal apparatus of claim 15,
wherein the pedal arm of the accelerator pedal apparatus and the pedal arm of the brake pedal apparatus have upper sides, connected to the respective pedal housings, bent outwardly in opposite directions, and installed to be symmetrical to each other in a lateral direction.

* * * * *